UNITED STATES PATENT OFFICE.

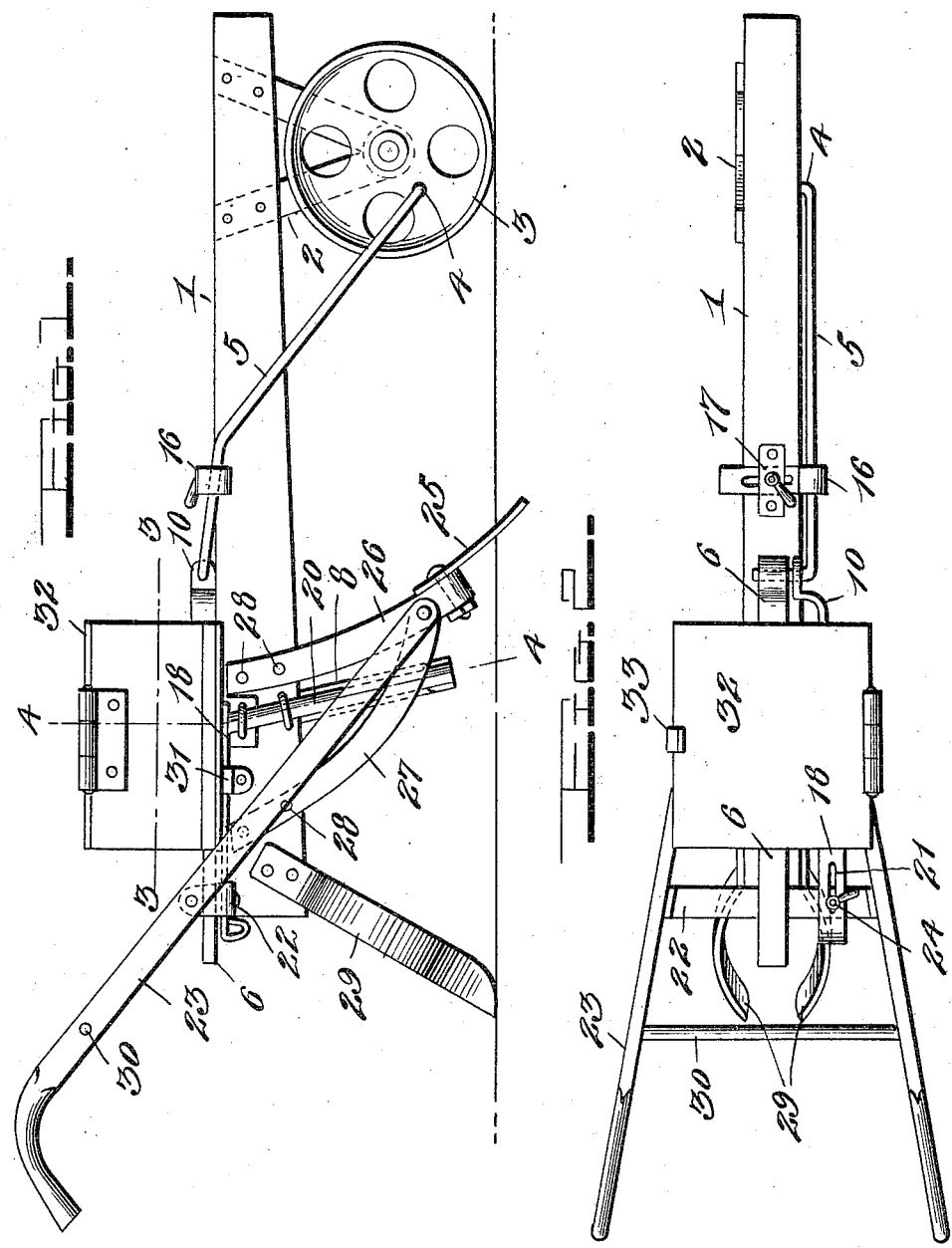

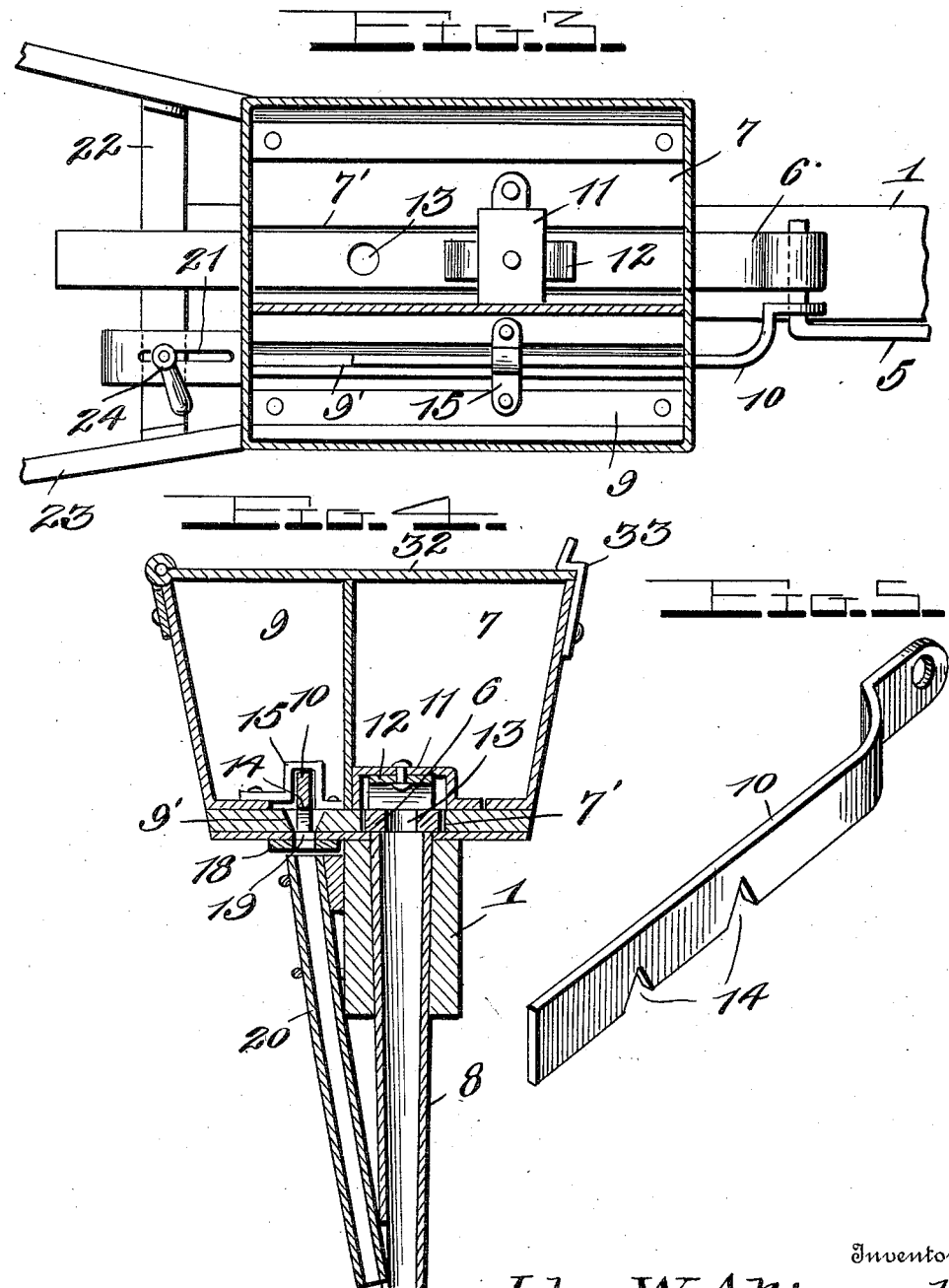

JOHN W. AKIN AND SAMUEL ARNETT, OF MITCHELLVILLE, TENNESSEE.

SEEDER, PLANTER, AND FERTILIZER-DISTRIBUTER.

1,049,319. Specification of Letters Patent. Patented Dec. 31, 1912.

Application filed May 13, 1911. Serial No. 626,891.

*To all whom it may concern:*

Be it known that we, JOHN W. AKIN and SAMUEL ARNETT, citizens of the United States, residing at Mitchellville, in the county of Sumner and State of Tennessee, have invented certain new and useful Improvements in Seeders, Planters, and Fertilizer-Distributers, of which the following is a specification, reference being had to the accompanying drawings.

This invention relates to seeders, and more particularly to seeders and planters for general seeds, and has for its object to provide a device of this character which will be very durable and efficient.

Another object of this invention is to provide means whereby the seeds will be automatically planted in the ground in regular intervals and in the quantities desired.

A further object of the invention is to provide means whereby the seeds can be fed in suitable quantities to the feed spout and at the same time be prevented from sticking in the hopper.

A still further object of the invention is to provide means whereby a plurality of different kinds of seeds may be fed to the furrow in close proximity with one another.

Another object of this invention is to automatically open the furrow for the seeds, and cover said furrow after the seeds have been dropped therein.

Other objects of the invention will become apparent as it is more fully set forth.

It is well known in seeders, the difficulty that is experienced in feeding different kinds of seeds to the same furrow, first because mixing them together will not produce this result, and second because of the different sizes of the seeds raising further obstacles to the desired result.

In this invention a hopper is provided, which has a plurality of compartments and feeding spouts, both being arranged independently of one another, and made suitable for the seeds and work they are to do.

The desirability of having two different kinds of seeds fed in close proximity to one another is well known to farmers, because of the beneficent action derived in many instances from a proper mixture of seeds, for instance, peas may be planted with corn, that the peas may climb up the stalk of the corn as it grows, and also because of the beneficial nitrogenic action produced on the soil, which assists the corn in growing.

In the accompanying drawings which illustrate by way of example an embodiment of this invention, Figure 1 represents a side elevation of the seeder embodying this invention; Fig. 2 is a plan view of Fig. 1; Fig. 3 is a section on the line 3—3 of Fig. 1; Fig. 4 is a sectional view taken along the line 4—4 of Fig. 1; and Fig. 5 is a detail of a seeder slide.

Similar reference characters refer to similar parts throughout the drawings.

In the construction shown in the drawings, 1 represents the main frame work of a seeder and planter which has mounted on the front end of it a journal or bearing 2, arranged to receive and hold a wheel 3. The wheel 3 is provided with a crank 4 to which is secured a pitman or connecting rod 5, that actuates the slide 6 which serves to permit seeds to flow through a hopper compartment 7 to a spout 8, and thence to the ground. The hopper compartment 7 is suitably mounted on the frame 1 and has adjacent to it a similar hopper compartment 9 arranged for other seeds of a different kind from that held in the compartment 7. The bottoms of these hopper compartments are provided with slots 7' and 9' in which the slide 6 and a slide 10 move respectively. The slide 10 is also attached to the connecting rod 5 and is actuated thereby at the same time and in the same direction as that given to the slide 6. Said slide 6 has seed openings 13. A bridge piece 11 is mounted on the bottom of the hopper in the compartment 7 and extends transversely over the slide 6. A sweep 12 is secured to the under side of the bridge and its downturned ends bear on the upper side of the slide. The bridge and sweep co-act as guides for the slide and to keep the latter in place in the groove 7' in which the slide is seated and operates, the bridge and sweep also co-acting to cover the upper end of the spout 8 and to prevent superfluous seeds from getting in the seed openings 13, thereby regulating the quantity of seeds which are dropped by the slide at each endwise movement of the latter. As the slide reciprocates the seed holes 13 are disposed over the spout 8 and permits the seeds to fall therethrough to the soil. The compartment 9 is very similar, except that it is shown in this case arranged for a much smaller size seed, and is provided with a slide 10 of a blade shape and is provided on the bottom edge with a number of V-shaped slots 14. 15 is a suitable guide for this slide 10, and 16 is guide bearing which is arranged to hold the upper end of the pitman rod 5 in engagement with the slides 6 and 10, and is provided with a catch pin 17 which can be lifted to permit the bearing 16 to be moved laterally out of engagement with the slides, that is, means are provided whereby the pitman rod can be disconnected from actuating the mechanism which permits the seeds to flow to the soil.

Mounted on the under side of the compartment 9 is a valve 18, which is arranged to control the hole 19 which is in the bottom of the compartment, and through which the seeds fall as they flow to the spout 20 which feeds the seeds from this compartment. This valve 18 is provided with a slot 21 and is supported on a plate piece 22, secured to a pair of the guide arms or handles 23 of the seeder.

24 is any suitable device for clamping the valve 18 to the plate 22 and is disposed through the slot 21 in order that the same may be adjusted in various positions. By adjusting this valve the size of the hole 19 is controlled so that various sized seeds can be permitted to flow therethrough to the feeding spout, also the quantity of seeds that flow through this hole can be controlled.

Mounted on the front and lower portion of the arms or handles 23 is a shovel 25 which is arranged to open a furrow as the seeder travels along the ground and is suitably supported by a standard 26 and with a brace 27 and held by a bolt 28 securely in position, as clearly shown in the drawings.

Mounted on the rear portion of the frame 1 and behind the feeding spouts are the coverers 29, which move the dirt over the seeds as the seeder travels over them.

30 is a suitable brace disposed between the upper portions of the arms 23 in order to strengthen them and keep them a suitable distance apart.

31 is a guide-way in which the valve 18 is reciprocated and 32 is a cover arranged to close the upper portion of the compartments 7 and 9. This cover is held in position in any suitable manner and locked by a spring catch 33.

In operation one size or class of seeds is poured into the compartment 7 and another class of seeds into the compartment 9 and the cover 32 is shut down on the same. The seeder, having been taken to the place of planting, the pitman rod is connected with the slides 6 and 10 and thus secured by positioning of the bearing 16. As the device travels over the ground, the shovel 25 will open the furrow and the wheel 3 will actuate the pitman rod and the slides 6 and 10, and permit the seeds to flow from their respective compartments intermittently through the holes in the slide 6, and to the spouts 8 and 20, and from thence into the furrow opened by the shovel while the coverers 29 draw the soil over the seeds that have just fallen, thereby putting them in a position to germinate. Referring particularly to the compartment 9 in which the slide plate 10 reciprocates it will be noticed that it has a somewhat V-shaped groove into which the seeds tend to fall and be guided to the middle portion of it. As the seeds fall into the V-shaped slot they will be taken by the plates and be pulled over the same in the bottom of this compartment, and thence dropped into the spout 20 disposed underneath where they are joined with the seeds that are flowing from the other compartment, and thereby be planted together.

The particular advantages of this device are, that it is adjustable, its action is positive, and its parts are easily accessible for inspection and repair, it can feed one or more kinds of seeds at the same time, it can feed various sizes of seeds to the same furrow, and its parts are comparatively few and particularly suitable for this class of work, at the same time the general cost of manufacture of this machine is comparatively low.

While the invention has been described as a double seeder, it is also particularly intended to be used as a fertilizer and seeder at the same time, in which case compartment 9 would be used for the fertilizer, the slide 10 being particularly suitable for putting the fertilizer into the spout 20. In this case also the slide 6 in the compartment 7 can be disconnected, should it be desired to stop the flow of seeds therefrom. By using a fertilizer feed in connection with the seeder, it is possible to make a great saving in the amount used, and at the same time save the incidental time which would be required if the fertilizer was put on separately.

Having thus described the invention what is claimed is:

1. In a seeder, the combination of a frame, a hopper carried thereby and having a plurality of compartments, independently mounted slides controlling the discharge from the respective compartments, said slides having alined transverse apertures, a draft beam, a drive wheel, a pitman rod eccentrically connected with the wheel and extending longitudinally of the beam to a point at one side of the apertures in the slides and there offset laterally in alinement with the said apertures, and a guide member detachably mounted on the beam and confining the pitman rod against lateral displacement, whereby the offset arm of the pitman rod can be attached to either or both of the slides and thus maintained to discharge one or more kinds of seeds severally.

2. In a seeder, the combination of a frame and hopper having a plurality of compartments, independent slides controlling the discharge from the respective compartments and having alined transverse apertures formed in the extremities thereof, a reciprocatory member, the inner end thereof being bent at right angles thereto and adapted to enter the alined apertures to detachably couple the slides, means to drive the reciprocatory member, a guide bearing supporting the inner end thereof, means for laterally adjusting said guide bearing whereby either or both of the slides may be actuated substantially as described.

In testimony whereof we hereunto affix our signatures in the presence of two witnesses.

JOHN W. AKIN.
SAMUEL ARNETT.

Witnesses:
J. T. McNEILL,
M. J. McComb.

Copies of this patent may be obtained for five cents each, by addressing the "Commissioner of Patents, Washington, D. C."